(12) United States Patent
Neu et al.

(10) Patent No.: US 9,945,221 B2
(45) Date of Patent: Apr. 17, 2018

(54) PROCESS FOR TREATING PRODUCED WATER EVAPORATOR CONCENTRATE

(71) Applicant: Veolia Water Technologies, Inc., Moon Township, PA (US)

(72) Inventors: Dorothy Neu, Pewaukee, WI (US); Mark C. Nicholson, Pewaukee, WI (US)

(73) Assignee: Veolia Water Technologies, Inc., Moon Township, PA (US)

( * ) Notice: Subject to any disclaimer, the term of this patent is extended or adjusted under 35 U.S.C. 154(b) by 207 days.

(21) Appl. No.: 15/145,517

(22) Filed: May 3, 2016

(65) Prior Publication Data

US 2016/0326015 A1 Nov. 10, 2016

Related U.S. Application Data

(60) Provisional application No. 62/158,034, filed on May 7, 2015.

(51) Int. Cl.
| | |
|---|---|
| *C02F 1/04* | (2006.01) |
| *E21B 43/40* | (2006.01) |
| *C02F 1/20* | (2006.01) |
| *C02F 1/52* | (2006.01) |
| *C02F 1/66* | (2006.01) |
| *C02F 101/10* | (2006.01) |
| *C02F 101/32* | (2006.01) |

(52) U.S. Cl.
CPC .............. *E21B 43/40* (2013.01); *C02F 1/048* (2013.01); *C02F 1/20* (2013.01); *C02F 1/52* (2013.01); *C02F 1/66* (2013.01); *C02F 2101/10* (2013.01); *C02F 2101/32* (2013.01)

(58) Field of Classification Search
CPC ...... C02F 1/04; C02F 1/20; C02F 1/52; E21B 43/40
See application file for complete search history.

(56) References Cited

U.S. PATENT DOCUMENTS

| | | |
|---|---|---|
| 3,218,241 A | 11/1965 | Checkovich |
| 4,444,675 A | 4/1984 | Goeldner |
| 2005/0022989 A1* | 2/2005 | Heins .................. E21B 43/2406 166/272.3 |

* cited by examiner

*Primary Examiner* — Brian A McCaig
(74) *Attorney, Agent, or Firm* — Coats & Bennett PLLC

(57) ABSTRACT

The present invention relates to a process for treating evaporator concentrate. The process includes generating or producing a vent stream that includes carbon dioxide and mixing the carbon dioxide with the evaporator blowdown to reduce the pH of the evaporator blowdown. In cases where the evaporator blowdown includes a significant concentration of silica, lowering the pH will precipitate silica from the evaporator blowdown.

14 Claims, 3 Drawing Sheets

PROCESS FOR TREATING PRODUCED WATER EVAPORATOR CONCENTRATE

This application claims priority under 35 U.S.C. § 119(e) from the following U.S. provisional application: Application Ser. No. 62/158,034 filed on May 7, 2015. That application is incorporated in its entirety by reference herein.

FIELD OF THE INVENTION

The present invention relates to processes for treating evaporator concentrate. More particularly, the present invention relates to a produced water treatment process that entails evaporating the produced water and producing an evaporator concentrate having a high pH. The concentrate is treated to reduce the pH.

BACKGROUND

Conventional oil recovery involves drilling a well and pumping a mixture of oil and water from the well. Oil is separated from the water, and the water is usually injected into a sub-surface formation. Conventional recovery works well for low viscosity oil. However, conventional oil recovery processes do not work well for higher viscosity, or heavy oil.

Enhanced Oil Recovery (EOR) processes employ thermal methods to improve the recovery of heavy oils from sub-surface reservoirs. The injection of steam into heavy oil bearing formations is a widely practiced EOR method. Typically, several tons of steam is required for each ton of oil recovered. Steam heats the oil in the reservoir, which reduces the viscosity of the oil and allows the oil to flow to a collection well. Steam condenses and mixes with the oil, to form an oil-water mixture. The mixture of oil and water is pumped to the surface. Oil is separated from the water by conventional processes employed in conventional oil recovery operations to form produced water.

For economic and environmental reasons it is desirable to recycle the produced water. This is accomplished by treating the produced water, producing a feedwater, and directing the treated feedwater to a steam generator or boiler and producing steam. The complete water cycle includes the steps of:
injecting the steam into an oil bearing formation,
heating the oil with steam whereupon the condensed steam mixes with the oil to form an oil-water mixture,
collecting the oil-water mixture in a well,
pumping the oil-water mixture to the surface,
separating the oil from the oil-water mixture to form produced water,
treating the produced water to form feedwater for steam generation equipment, and
converting the feedwater into steam having a quality of approximately 70% to 100% for injecting into the oil bearing formation.

Steam generation equipment can take various forms that generally include either once through steam generators (OTSG) or boilers of various types. However, treating the produced water to form a relatively pure feedwater for steam generation is challenging. In particular, treating the produced water to retard or prevent silica scaling in purification equipment, such as evaporators, and in steam generation equipment is difficult. Various approaches have addressed silica scaling. One method chemically treats the produced water and subjects the chemically-treated produced water to an evaporation process that produces a distillate which becomes feedwater to an OTSG or boiler. In particular, it is known to use an evaporator to produce the distillate. In this particular approach, the pH of the produced water fed to the evaporator is raised to maintain the solubility of silica. This prevents silica based scales from fouling the evaporator heat transfer surfaces. However, there are drawbacks and disadvantages to this approach. The addition of caustic to raise the pH represents a significant operating cost. Evaporators recover typically approximately 95% of the water from the de-oiled produced water. The remaining 5% yields a concentrate stream that is difficult to dispose of. The pH is usually higher than 12, which makes the concentrate stream extremely hazardous. The stream must be neutralized in order to reduce pH prior to disposal. The cost of the chemicals required to neutralize the concentrate stream can be significant to operations. As a result of pH reduction, silica precipitates, and the silica solids are typically removed prior to disposal in a well to prevent plugging.

Therefore, there has been and continues to be a need for a practical and cost effective way of treating a high pH evaporator concentrate for disposal.

SUMMARY OF THE INVENTION

The present invention relates to a process for mixing a vent stream containing carbon dioxide with evaporator blowdown to lower the pH of the evaporator blowdown.

In some embodiments, the process entails mixing a vent stream containing carbon dioxide with evaporator blowdown in order to lower the pH of the evaporator blowdown.

In one embodiment, produced water is directed into an evaporator that evaporates the produced water to yield a distillate and an evaporator blowdown. A carbon dioxide-containing vent stream from an upstream deaerator, the evaporator, steam generator or other associated system is mixed with the evaporator blowdown to lower the pH of the evaporator blowdown. In some cases, the evaporator blowdown may have a relatively high pH as a result of a pH adjustment. The mixing of carbon dioxide with the evaporator blowdown will reduce the pH.

Other objects and advantages of the present invention will become apparent and obvious from a study of the following description and the accompanying drawings which are merely illustrative of such invention.

DESCRIPTION OF EXEMPLARY EMBODIMENTS

Figure 1:
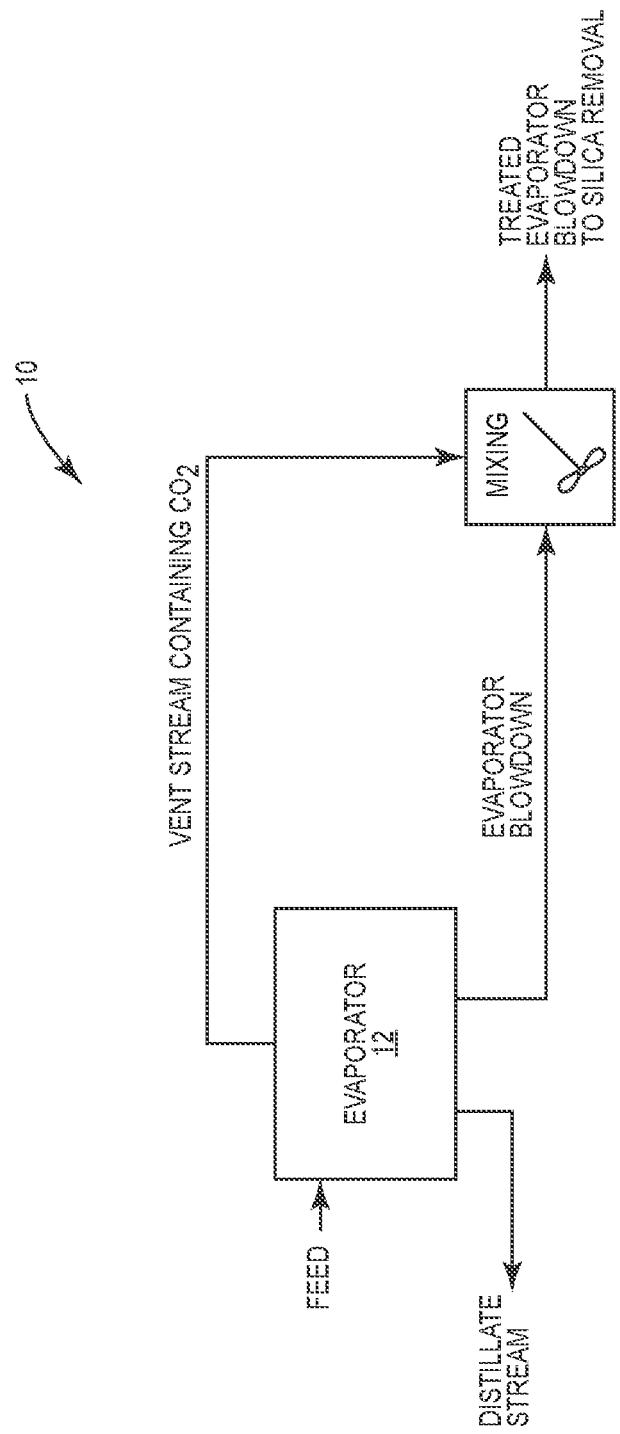
FIG. 1 is a schematic illustration showing a process for treating evaporator blowdown.

With further reference to the drawings, FIG. 1 shows an evaporation process. A feed is directed into an evaporator 12. Evaporator 12 produces a distillate stream, an evaporator blowdown, and a vent stream containing $CO_2$. The vent stream is mixed with the evaporator blowdown. Since the vent stream contains carbon dioxide, the mixing of the vent stream with the evaporator blowdown reduces the pH of the evaporator blowdown.

In some embodiments, a deaerator may be placed upstream of the evaporator 12. In this case, the feed is directed into the deaerator and carbon dioxide is stripped from the feed in the deaerator. A vent stream containing carbon dioxide is emitted from the deaerator. The vent stream containing the carbon dioxide can be mixed with the evaporator blowdown to lower the pH of the evaporator blowdown.

Figure 2:
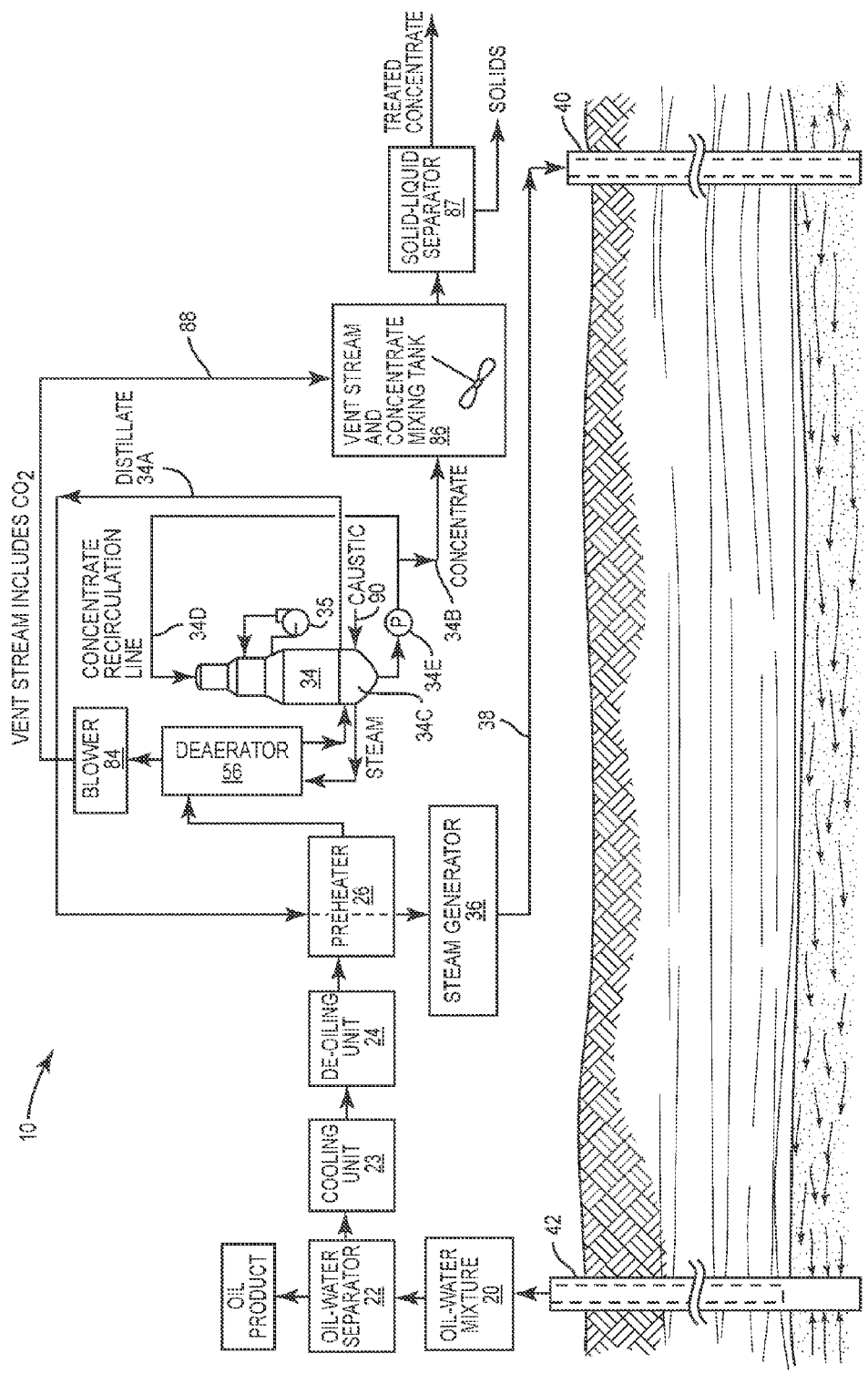
FIG. 2 shows a schematic illustration of a produced water treatment process wherein a vent stream containing carbon dioxide is mixed with the evaporator blowdown.

FIG. 2 shows a process for recovering oil, particularly heavy oil such as recovered by SAGD processes, from oil wells and oil-bearing formations. The method or process for treating high pH evaporator concentrate, shown in FIG. 1 and described above, is incorporated into the process of FIG. 2. Here, heavy oil is typically recovered by injecting steam into oil-bearing underground formations. Steam heats the oil in the oil-bearing formation and in the process, the steam condenses. This produces an oil-water mixture 20 that is collected from the oil well 42 and pumped to the surface. The oil-water mixture is directed to an oil-water separator 22. This is generally referred to as a primary oil-water separation process. Various conventional oil-water separation systems can be employed. For example, gravity or centrifugal separators can be used to separate the oil-water mixture to yield an oil product and separated water.

Typically the produced water has a temperature of approximately 160 to 180° C. To cool the produced water before further processing, the produced water is directed into a cooling unit 23 where the temperature of the produced water is typically reduced to approximately 85° C. In this way, the de-oiling unit 24 can be operated as tanks and not pressure vessels. After the produced water is cooled, it is directed to the de-oiling unit 24 where additional oil is removed. Various de-oiling devices, such as an induced gas flotation system, can be used. In some instances, a de-oiling polymer is added to the water separated by the oil-water separator 22. Effluent from the de-oiling unit 24 is referred to as produced water. It is this produced water that is treated and conditioned before being reused to generate steam.

Produced water is directed from the de-oiling unit 24 to a preheater or heat exchanger 26. Produced water is heated in the preheater 26. Heat is applied by the distillate 34A which is produced by the downstream evaporator 34. Note in FIG. 2 where the distillate 34A is pumped from the evaporator 34 to the preheater or heat exchanger 26 and from there the distillate is directed to a steam generator 36.

From the preheater 26, the produced water may be directed into the deaerator 56 and flows downwardly through the deaerator into the evaporator 34. This is an optional step. Deaerator 56 removes dissolved gases, such as oxygen and carbon dioxide. These gases are problematic because they tend to cause corrosion problems. This is particularly a troubling problem in cases where evaporators are used to evaporate produced water. At high temperatures and pressures, dissolved carbon dioxide combines with metal and forms carbonic acid, which also causes corrosion on surfaces of metal. Oxygen, in the presence of chlorides, can cause localized corrosion in the form of pitting and crevice corrosion, especially at high temperatures found in evaporators. In order to remove oxygen and carbon dioxide from feedwater, air or steam is directed upwardly through the deaerator 56 in a counter-flow relationship with the downwardly flowing feedwater. In the example shown in FIG. 2, steam from the downstream evaporator 34 is directed into the lower portion of the deaerator. As noted above, other forms of gas can be used to deaerate the feedwater, as well as a system or process such as disclosed in U.S. Patent Application Ser. No. 62/039595, which is expressly incorporated herein. In any event, a vent stream exits the upper portion of the deaerator 56. Generally because of the concentration of carbon dioxide in the feedwater, the vent stream emitted from the deaerator is rich in carbon dioxide. It also should be pointed out that in cases where the feedwater includes excess alkalinity that an acid can be added upstream of the deaerator 56. The acid will lower the pH of the feedwater and effectively convert alkalinity, especially bicarbonate alkalinity, to $CO_2$ which is removed or substantially removed in the deaerator 56.

From the deaerator 56, the feedwater is directed into the evaporator 44. It may be desirable to raise the pH of the produced water prior to the produced water reaching the heat transfer tubes of the evaporator 34. To accomplish this, a caustic, such as sodium hydroxide, can be added in the lower portion of the deaearator or can be injected as indicated in FIG. 2 into the sump of the evaporator 34 via the chemical addition line 90.

Evaporator 34 functions to evaporate at least a portion of the produced water. In the process, evaporator 34 produces a distillate and a concentrate, sometimes referred to as a concentrated brine. The concentrate is treated by reducing its pH.

Evaporator distillate 34A is substantially pure. There may be small amount of dissolved solids, on the order of 10 mg/L or less in the distillate 34A. The distillate is directed to a steam generator 36 where the distillate is converted to steam. Various types of steam generators can be employed. For example, the steam generator 36 may include a conventional boiler or package boiler. Moreover, the steam generator 36 may be an OTSG that is employed with a steam-water separator for separating steam from a steam-water mixture produced by the OTSG.

Continuing to refer to FIG. 2, steam generator 36 produces steam that is directed from the steam generator to an injection well 40. In the embodiment illustrated, the injection well is spaced from the oil well 42 that actually produces the oil-water mixture 20. In conventional fashion, steam injected in to the injection well 40 migrates horizontally to an area around the oil well 42 where the steam mixes with the oil in the oil well or oil-bearing formation and condenses to reduce the viscosity of the oil and generally mobilized the oil to produce the oil-water mixture 20 referred to above.

Evaporator 34 may be of various types. For example, the evaporator 34 may be a vertical falling film evaporator, a forced circulation evaporator, a horizontal falling film evaporator, submerged tube evaporator, or a rising film evaporator. In the case of a vertical falling film evaporator, the same includes an array of vertically aligned heat transfer surfaces, the sump 34C for collecting and holding concentrate, a recirculating line 34D leading from the sump to an upper portion of the evaporator for distribution of concentrate to the upper ends of the vertical heat transfer surface and a recirculation pump 34E in the recirculation line 34D for pumping concentrate from the sump to the upper portion of the evaporator where the concentrate is distributed to the heat transfer surface. When the concentrate is distributed, the concentrate forms a thin film that falls down along the inside of the heat transfer surfaces. The heat transfer surface is heated, resulting in a portion of the concentrate vaporizing and forming a vapor, and in the process the concentrate is further concentrated and falls into the sump 34C. Evaporator 34, in this example, is a mechanical vapor recompression (MVR) evaporator. Produced vapor is received by a compressor 35 and compressed, producing steam which is directed against the outside of the heat transfer surface, again heating the thin film of concentrate falling downwardly along the inside surfaces of the tubes. The steam condenses and is collected as distillate 34A that is directed to the steam generator 36.

Figure 3:
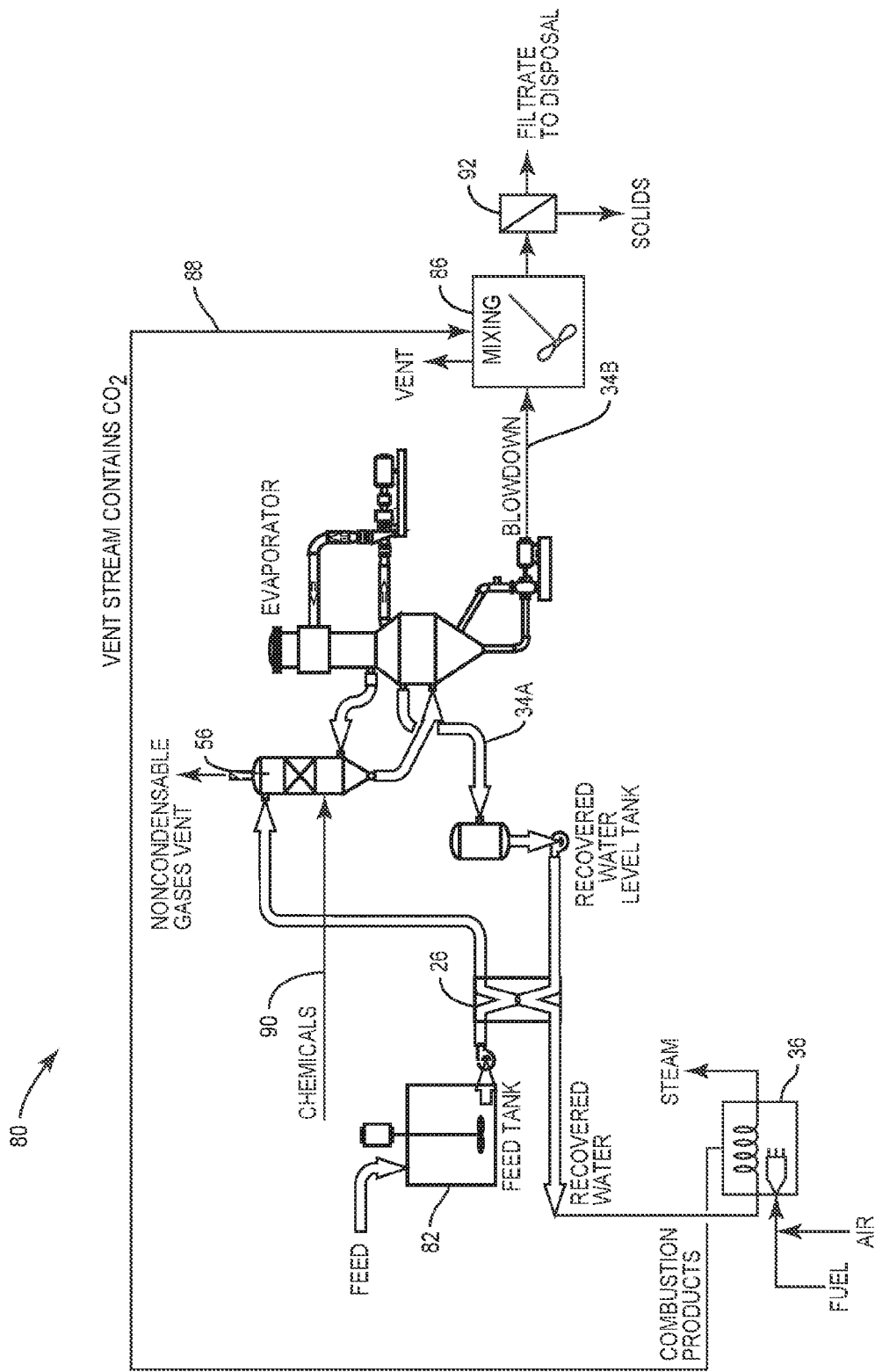
FIG. 3 is a schematic illustration of a process where a vent stream containing carbon dioxide generated by a steam generator is mixed with evaporator blowdown to reduce the pH of the evaporator blowdown.

As noted above, the pH of the feedwater can be raised before reaching the evaporator 34. The concentrate in the sump 34C may have a relatively high pH on the order of 12-13 in many cases. Before the concentrate can be disposed of, the concentrate may be treated to reduce the pH, and precipitated silica solids removed therefrom. Thus, as shown in FIG. 2, the concentrate 34B is pumped into the mixer 86. It will be recalled that a vent stream that is relatively rich in carbon dioxide is produced. The method or process of the present invention entails taking at least a portion of this vent stream and directing it to the mixer 86 and mixing the carbon dioxide of the vent stream with the concentrate. There are other devices or systems incorporated into this process or associated with this process that can be utilized to produce a vent stream that contains a significant concentration of carbon dioxide. Although one embodiment has been discussed that entails a deaerator located upstream of the evaporator, it should be pointed out that the evaporator itself can produce a vent stream that has a significant concentration of carbon dioxide. It should be further pointed out that, as discussed hereafter and as shown in FIG. 3, a steam generator can produce a vent stream that has a significant concentration of carbon dioxide. In all of these cases, such vent streams can be mixed with the evaporator blowdown or concentrate to reduce the pH of the evaporator blowdown.

In the mixer 86, the carbon dioxide is thoroughly mixed with the concentrate from the evaporator 34. This reduces the pH of the concentrate. Generally, sufficient carbon dioxide is added in order to reduce the pH of the concentrate to less than 8. By reducing the pH in the concentrate, the solubility of the silica, for example, contained therein is reduced. Hence, in this example, silica is precipitated from the concentrate. From the mixer 86, the concentrate is directed to a separation device or system 87. There are numerous types of devices that will separate solids from the evaporator concentrate. As shown in FIG. 2 and discussed above, one type of device that can be used to separate solids such as precipitated silica, for example, is a membrane separation unit. Now the concentrate can be disposed of in conventional ways.

FIG. 3 illustrates a process for treating a wastewater stream with an evaporator wherein a vent stream produced by the steam generator 36 (which could be, for example, a once-through steam generator or a package boiler) contains a significant concentration of carbon dioxide and is mixed with the evaporator blowdown to reduce the pH of the evaporator blowdown. More particularly, a distillate produced by the evaporator is sent to the steam generator 36. Steam generator 36 uses fuel and air and produces steam through combustion (direct fire boiler) and a combustion product gas stream that contains the carbon dioxide. This gaseous stream is a good source of carbon dioxide and can be directed to a mixer 86 where the carbon dioxide is mixed with the evaporator concentrate.

FIG. 3 depicts various processes and systems upstream and downstream of the evaporator. These are exemplary systems and processes and may vary from one application to another application. However, in the interest of providing a unified understanding of an exemplary process, the system and process depicted in FIG. 3 will be briefly described.

An evaporator feedwater is directed into tank 82. From tank 82, the evaporator feedwater is directed through a pre-heater 26 which heats the feedwater. From the pre-heater 26, the feedwater is directed downwardly through a deaerator 56. Here, non-condensable gases are stripped or removed from the evaporator feedwater. As discussed above, in some cases the evaporator feedwater may contain a substantial concentration of silica. To prevent the silica, for example, from scaling the downstream heat transfer surface of the evaporator, a caustic such as sodium hydroxide is added to the feedwater to keep the silica in solution and prevent scaling of the evaporator. In the embodiment shown in FIG. 3, there is a chemical injection line 90 that can be used to inject the caustic into the feedwater. Evaporator 34 produces a distillate 34A and a blowdown or concentrate 34B. The distillate 34A exits the evaporator and flows through the pre-heater 26 to the steam generator 36. The steam generator 36 produces steam and combustion products that, as discussed above, are directed through vent line 88 to the mixing tank 86. When this process is incorporated into a SAGD process, the steam can be injected into an oil-bearing formation.

The evaporator blowdown 34B is directed into the mixing tank 86 and mixed with the vent stream that contains the carbon dioxide. As discussed below, this reduces the pH of the evaporator blowdown.

In the particular embodiment illustrated, the treated evaporator blowdown with an adjusted pH is directed to a solids separation device 92. This device functions to separate solids from the evaporator blowdown. In one embodiment, it is contemplated that the solids separation device 92 comprises a membrane separation unit that is effective to separate precipitated and suspended solids from the evaporator blowdown. Once the pH of the evaporator blowdown has been reduced, a filtrate is produced. This filtrate can be disposed of through conventional means.

The process disclosed in FIG. 3 and described above can be applied to various types of wastewater streams. As suggested above, it is an efficient process in treating wastewater streams. It is also applicable and efficient when incorporated into a SAGD process.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:

1. A method of treating a wastewater stream comprising:
   directing the wastewater stream to an evaporator;
   treating the wastewater stream in the evaporator by evaporating the wastewater stream and producing a distillate and an evaporator blowdown;
   producing a vent stream containing carbon dioxide; and
   mixing the vent stream containing the carbon dioxide with the evaporator blowdown to reduce the pH of the evaporator blowdown.

2. The method of claim 1 including deaerating the wastewater stream upstream of the evaporator by employing a deaerator, and wherein the vent stream containing the carbon dioxide is produced by the deaerator.

3. The method of claim 1 wherein lowering the pH of the evaporator blowdown by mixing the vent stream containing carbon dioxide with the evaporator blowdown results in the precipitation of silica and the method includes removing the precipitated silica from the evaporator blowdown.

4. The method of claim 1 further including:
   directing the evaporator blowdown to a mixing tank;

directing the vent stream containing the carbon dioxide to the mixing tank; and mixing the evaporator blowdown and the vent stream containing the carbon dioxide in the mixing tank.

5. The method of claim 4 wherein the mixing of the vent stream containing carbon dioxide with the evaporator blowdown forms an evaporator blowdown mixture and the method further includes directing the evaporator blowdown mixture to a solids-liquid separator and separating solids and yielding a treated concentrate.

6. The method of claim 1 wherein the vent stream containing the carbon dioxide is produced by a deaerator located upstream of the evaporator, or a steam generator.

7. The method of claim 1 including directing the distillate produced by the evaporator to a steam generator and producing steam, and wherein the steam generator produces the vent stream containing the carbon dioxide.

8. The method of claim 7 including directing the vent stream from the steam generator to a mixing tank and directing the evaporator blowdown from the evaporator to the mixing tank and mixing the vent stream from the steam generator with the evaporator blowdown in the mixing tank.

9. A method of recovering oil from an oil well comprising:
removing an oil-water mixture from the well;
separating oil from the oil-water mixture to produce oil and produced water;
directing the produced water into an evaporator and evaporating at least a portion of the produced water and producing a distillate and an evaporator blowdown;
directing the distillate to a steam generator and heating the distillate in the steam generator to form steam;
producing a vent stream containing carbon dioxide; and
mixing the vent stream containing carbon dioxide with the evaporator blowdown and reducing the pH of the evaporator blowdown.

10. The method of claim 9 wherein the vent stream is produced by a deaerator located upstream of the evaporator, the evaporator, or the steam generator.

11. The method of claim 9 including increasing the pH of the produced water upstream of the evaporator or increasing the pH of the produced water in the evaporator.

12. The method of claim 9 including separating silica from the evaporator blowdown after the vent stream has been mixed with the evaporator blowdown.

13. The method of claim 9 wherein the steam generator produces the vent stream containing carbon dioxide and wherein the method includes directing the vent stream containing the carbon dioxide from the steam generator to a mixing tank and the method further includes directing the evaporator blowdown from the evaporator to the mixing tank and mixing the vent stream with the evaporator blowdown in the mixing tank.

14. The method of claim 13 wherein mixing the vent stream containing the carbon dioxide with the evaporator blowdown lowers the pH of the evaporator blowdown and causes silica to precipitate from the evaporator blowdown and the method includes, after lowering the pH of the evaporator blowdown, directing the evaporator blowdown to a solids-liquid separator that separates solids from the evaporator blowdown and yielding a treated concentrate.

* * * * *